United States Patent [19]

Inaba et al.

[11] Patent Number: 4,961,035
[45] Date of Patent: Oct. 2, 1990

[54] ROTATIONAL ANGLE CONTROL OF SCREW TIGHTENING

[75] Inventors: Hidetoshi Inaba, Yokohama; Hiroshi Hasegawa, Kanagawa; Hiroshi Kato, Hatano, all of Japan

[73] Assignee: Hitachi, Ltd., Tokyo, Japan

[21] Appl. No.: 304,649

[22] Filed: Feb. 1, 1989

[30] Foreign Application Priority Data

Feb. 4, 1988 [JP] Japan .................................. 63-22787

[51] Int. Cl.⁵ ............................................ G05B 19/28
[52] U.S. Cl. ...................................... 318/600; 173/12; 318/652; 388/810
[58] Field of Search .................. 29/407; 173/12, 5; 318/560–563, 600, 603, 615–617, 488, 567–569, 571, 652; 81/52; 388/800–802, 904, 809–815, 903

[56] References Cited

U.S. PATENT DOCUMENTS

| | | | |
|---|---|---|---|
| 3,940,675 | 2/1976 | Schroeder | 318/600 |
| 4,083,270 | 3/1977 | Tomkinson | 173/12 |
| 4,185,701 | 1/1920 | Boys | 173/12 |
| 4,285,112 | 8/1981 | Eshghy | 173/12 |
| 4,316,512 | 2/1982 | Kibblewhite et al. | 173/12 |
| 4,611,377 | 9/1986 | McCormick et al. | 29/407 |
| 4,648,282 | 3/1987 | Alender et al. | 173/12 |
| 4,766,985 | 8/1988 | Brusasco | 318/488 |

FOREIGN PATENT DOCUMENTS 58-56776  4/1983  Japan.
62-246482 10/1987  Japan.

Primary Examiner—William M. Shoop, Jr.
Assistant Examiner—David Martin
Attorney, Agent, or Firm—Fay, Sharpe, Beall, Fagan, Minnich & McKee

[57] ABSTRACT

The turn-of-nut tightening method that is improved by determining the starting point only through measurements of the angle and time relationship to determine the linear portion of the tightening curve, which is extended to the previous free running speed point where the corresponding angle is determined as the starting angle, to which is added a fixed turning amount to control the end of the tightening. As a specific embodiment, the turning angle is chosen as the variable and measured with specific time intervals. Using fixed time intervals, time is removed as a variable. Therefore, with a simple and economical angle measuring device, such as a shaft encoder, tightening is accurately controlled.

23 Claims, 5 Drawing Sheets

ROTATIONAL ANGLE CONTROL OF SCREW TIGHTENING

BACKGROUND OF THE INVENTION

The present invention relates to the so-called turn-of-nut tightening method of controlling the tightening of a screw-turning device, depending upon the rotational angle.

Screw tightening devices may be classified according to two different types.

The first type employs a calibrated torque wrench for tightening to a specified torque.

The second type of control device employs the rotational angle control, termed "turn-of-nut" tightening type wherein the tightening of the screw is managed in accordance with the rotational angle of the screw during tightening. The turn-of-nut tightening method enables the management of the tightening force to a high degree of accuracy compared with the calibrated torque wrench tightening type of device. This is because the tightening force, that is the axial tension of the screw, increases according to the angle of tightening the screw. Japanese Patent Laid Open No. 58-56776 employs a tightening method commonly referred to as the snug torque method. A more accurate tightening method is employed in the turn-of-nut tightening method as disclosed in Japanese Patent Laid Open No. 62-246482, wherein a linear portion of the torques vs. rotational angle characteristic curve during tightening of the screw is found and extended to where the torque was zero in accordance with a linear expression to determine a tightening starting point at the intersection.

SUMMARY OF THE INVENTION

It is an object of the present invention to provide a highly accurate tightening control of a screw tightening machine that is simple and economical.

More particularly, the present invention is directed towards the turn-of-nut tightening method that is improved by determining the starting point only through measurements of the angle and time relationship to determine the linear portion of the tightening curve, which is extended to the previous free running speed point where the corresponding angle is determined as the starting angle, to which is added a fixed turning amount to control the end of the tightening. As a specific embodiment, the turning angle is chosen as the variable and measured with specific time intervals. Using fixed time intervals, time is removed as a variable. Therefore, with a simple and economical angle measuring device, such as a shaft encoder, tightening is accurately controlled.

BRIEF DESCRIPTION OF THE DRAWING

Other objects, features and advantages of the present invention will become more clear with the following detailed description of the preferred embodiment, shown in the drawing, wherein.

DETAILED DESCRIPTION OF A PREFERRED EMBODIMENT

The present invention relates to production type machinery wherein it is desired to tightening coupling members, particularly screws, in assembling components that are very sensitive to the axial tension in the tightening members. Specifically, the present invention came out of the field of computer disc drives, wherein the screws are used in the assembly of the disc units. If the screws are too loose, they work loose during vibration and thermocycling so that slackening of the screws will lead to early breakdown of the disc drives. If the screws are tightened too much, there will be distortion with respect to the magnetic disc drive units and again there Will be early breakdown, particularly With respect to the heads. The breakdown resulting from these two undesirable conditions will be premature and the result of only very small differences between tightening of threaded members due to the extremely small accuracy tolerances employed in operation of high speed, high density disc drive units.

According to the conceptional portion of the present invention, it is important to understand the analysis of the conventional techniques. A primary consideration in determining the accuracy of the control of the axial tightening force in the turn-of-nut tightening method is the determination of a point at which the tightening member, screw, is closely contacted with the object being assembled, that is the determination of the screw tightening starting point. It is the accurate, economical and simple determination of the screw tightening starting point that is the primary consideration of the present invention.

Conventionally, a point at which a certain fixed torque load is reached is determined as a screw tightening starting point as disclosed, for example, in Japanese Patent Laid Open No. 58-56776, but torque based determination techniques are not accurate as will be disclosed in more detail hereinafter.

With respect to the turn-of-nut tightening method, the snug torque tightening method measures the load torque and determines the screw tightening starting point. Particularly this method is disclosed in Japanese Patent Laid Open No. 62-246482, wherein the torque must be measured in order to determine the torque-rotational angle characteristic. Before such a measurement, a torque measuring instrument of the strain gage type is used along with a converting device for converting detected values of load torque of a motor current and motor voltage of the screw tightening device into a torque. This torque measuring device is employed to determine the linear portion of the torque vs. rotational angle curve, for calculation of the starting point. A rotational angle is added to this starting point to determine the ending point. Very accurate results are obtained. However, in addition to the torque measuring device, it is necessary to employ an accurate angle measuring device so that the fixed angle may be added to the starting point. With devices actually constructed, it has been found that the torque measuring device is considerably larger than the angle measuring device, perhaps three of four times as large and also far more costly. Accordingly, this conventional screw tightening device is complicated in structure and expensive. It is an object of the present invention to eliminate the expensive and bulky torque measuring device without adding any new measuring devices to obtain a tightening device that is at least as accurate as this conventional type and which accordingly is less expensive and less bulky.

Furthermore, since the torque and data measured by the conventional device is outputted as an analog value from the torque measuring device or torque converting device, such measurement data signals are influenced by noise. Thus, this conventional device has a drawback with respect to accuracy. Therefore, it is a further object of the present invention to eliminate the use of analog data signals and thereby remove the disadvantages of the noise influence.

Therefore, it is the object of the present invention to devise an inexpensive screw tightening device depending upon only the relationship between rotational angle and time for control for the tightening of the coupling, particularly the screw, to overcome the disadvantages of the problems with respect to the conventional apparatus described above, and such control is obtained with a high degree of accuracy, even higher than that obtained with a conventional device.

The screw tightening device of the present invention employs a motor, which may be, for example, an electric motor or a fluid motor. In any event, this motor is of the type wherein the rotational speed varies in response to a change in tightening angle in the absence of any speed control. The motor is of the rotary type to tighten a rotary coupling. The rotary coupling may be of any particular type, for example a threaded coupling and more specifically a threaded screw for joining members together during assembly in a production line. The motor has a rotational output, broadly referred to herein as a shaft, for transmitting the rotational power to the coupling.

Additionally, the tightening control device employs a detector or measuring device that will determine the relationship between the rotational angle of the shaft and time, with a high degree of accuracy. The present invention discloses a preferred embodiment that is specifically referred to as measuring angles at particular times, more specifically measuring angles of rotation at fixed time intervals, the device is really measuring the relationship between angular position and time, and can also be thought of as measuring time at angular positions, and could more specifically measure the time between fixed angular positions of shaft rotation. In any event, a highly accurate shaft encoder is specifically employed with the preferred embodiment.

The tightening further employs a controller that will receive data only with respect to angle and time for processing to determine the starting point for a subsequent fixed angle of rotation to determine an end to the tightening procedure. Specifically, a screw tightening starting point is calculated from data that determines a linear portion of a rotational angle-rotational speed characteristic, for example, of the motor based upon the rotational angle and time data. The screw tightening device is constructed such that with this determination of the linear portion, a starting angle for the tightening operation is determined, although actually already passed, to which is added a fixed turning angle to determine the ending angle for the tightening operation. More specifically, the starting point is determined as the intersection of an extension of the linear speed running speed point. The free running speed is the constant speed, change in angle divided by change in time being constant, before tightening.

A basis of the present invention is the employment of a motor, for example an electrical motor, wherein the rotation speed varies in response to a change in the angle during the tightening operation of the threaded coupling, particularly according to the following expression:

$$w = aA + wo \tag{1}$$

In this formula w is the rotational speed of the shaft, wo is the rotational speed during no-load running of the tightening device, A represents the angle during tightening, and a is a negative gradient of tightening angle/rotational speed characteristic (a constant). The angle during tightening, as recognized by the inventor, in this environment is related to torque.

The controlling device of the present invention can execute the reception, calculation and processing of rotational angle/time data (relationship of shaft angle to time) and control the energization of the motor. More preferably, the rotational angle data is received for a plurality of fixed very short sampling times $\Delta t$. Therefore, the rotational angle has a relationship according to the following expression:

$$wi = (\phi i - \phi i - 1)/\Delta t \tag{2}$$

In this expression, $\phi i$ is the rotational angle data received at a specific time i and wi is the rotational speed at such time, and $\phi i-1$ is the rotational angle data received at the timed interval $\Delta t$ before time i.

When a screw is controlled in accordance with the rotational angle by a screw tightening device having such a construction as described with respect to the present invention, the screw tightening starting point wo is represented by the following expression:

$$\phi 0 = \frac{w2 - w0}{w2 - w1} \phi 1 - \frac{w1 - w0}{w2 - w1} \phi 2 \tag{3}$$

This expression is based upon the expression (1) that defines the linear portion and is obtained by equating the slopes at different time intervals and corresponding angle intervals, wherein w1 and w2 are respective rotational speeds at times 1 and 2 after the screw has been closely contacted with the object being assembled and after the linear portion of the curve has been reached. $\phi 1$ and $\phi 2$ are the corresponding rotational angles at these times.

In this manner, a screw tightening starting point can be determined in accordance with this expression (3) from the rotational angle data of the shaft of the electric motor and a rotational speed calculation (merely the change in the rotational angle relative to the change in the time interval at Which the angle measurements were made). The rotational speed is calculated in accordance with the expression (2) from the rotational angle data. Thus, it is seen that no torque data is required as in the prior art. Therefore, the present invention determines the linear portion of the curve and more specifically the starting point only from the relationship of shaft angle and time.

According to the degree of tightening desired, a specific rotational angle is added to the starting rotational angle $\phi o$ to obtain the tightening ending angle and therefore obtain the desired axial tension within the coupling within a very high degree of accuracy while only employing a measuring device measuring the relationship of time and angle.

Figure 1:
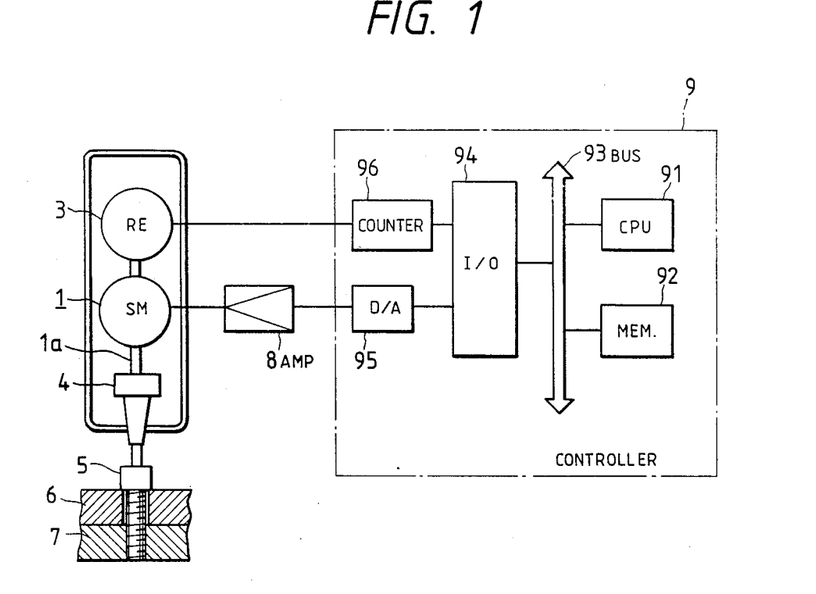
FIG. 1 is a schematic illustration of the screw tightening device according to the preferred embodiment.

A specific structural embodiment of the present invention is set forth with respect to FIG. 1. In FIG. 1, the motor 1 is preferably an electric motor. Most preferably, a servo motor is employed but without the feed back speed control loop, so that in any event the motor has a characteristic of speed reduction with increased angle during tightening, more specifically a linear speed reduction portion of its characteristic curve with respect to increased tightening angle. The motor employs a shaft 1a and an angle measuring instrument, particularly a shaft encoder 3, which can measure a rotational angle of the motor shaft 1a at each predetermined sampling time. The sampling data of the encoder 3 is fed to a controller 9, which in turn controls the motor 1 through an amplifier 8. In this manner, the rotational angle that the motor is to rotate past the starting angle is set in advance and control of the motor is through the servo amplifier 8 to rotate the motor shaft 1a by the preset rotational angle from the screw tightening starting point that is calculated based upon the measured value of the rotational angle received from the rotary encoder 3.

Figure 2:
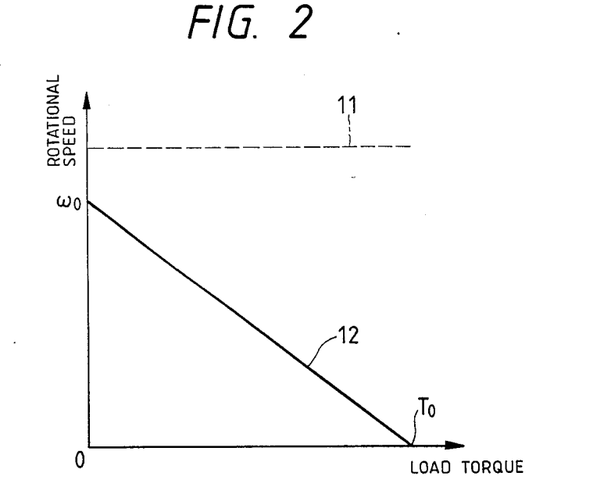
FIG. 2 is a rotation speed vs. load torque diagram useful in explaining a portion of the present invention.

The shaft 1a drives a tightening device, more specifically a bit 4 having one end mounted on the motor shaft 1 and the other end fitted with a drive coupling to a screw 5 to transmit tightening torque of the servo motor 1 to the screw 5, and thereby rotation of the bit 4 will tighten the screw 5 to assemble the objects 6 and 7 with an accurately determined course, particularly the axial tension on the screw 5. In general, the screw 5 and the object 6 and 7 represent a coupling of a threaded type, wherein threaded in broadly used to refer to the rotation of a coupling element and the interaction of rotary cam surfaces, specifically threads, to impart axial tension to the rotary portion of the coupling to establish the coupling action. The servo motor 1, without any feedback speed control, has the characteristic as shown in FIG. 2, wherein the speed decreased from a maximum no-load free running speed wo with increasing tightening angle until the motor stops at some torque To.

In contrast to the motor employed by the present invention there is a type of servo motor employed in conventional devices wherein the rotational speed of the motor is fixed according to the characteristic line 11 by way of a feed back loop for the servo amplifier 8. That is, a more common servo motor, not employed by the present invention, might be employed with a tachometer or some other way of measuring its speed so that speed may be compared With a reference to provide feedback in a servo loop including the servo amplifier 8 so that if the speed started to drop with increased torque, the speed would again be increased until the fixed rotational speed in maintained. As mentioned, the present invention employs a motor having the characteristic closer to the characteristic 12 than the characteristic 11.

Figure 3:
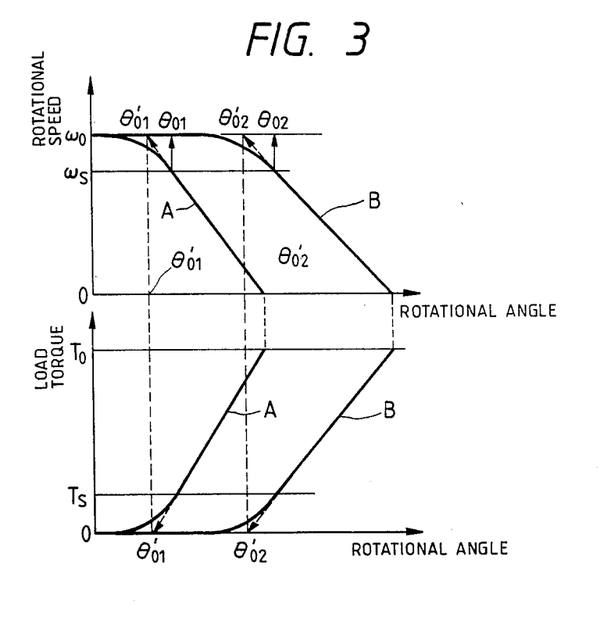
FIG. 3 is a rotational speed vs. rotational angle and related load torque vs. rotational angle illustration explaining the principles of the present invention.

According to the present invention, the rotational speed vs. rotational angle and load torque vs. rotational angle for two quite different coupling members A and B is illustrated in FIG. 3. Coupling members A and B may be two different screws of the same type that differ from each other with respect to the coefficients of friction due to manufacturing tolerances under the presence or absence of such things as surface defects, oil, dirt or the like.

As a part of the present invention there is the analysis of the coupling tightening operation, particularly with respect to the conventional methods of determining the screw tightening starting point by a screw tightening device employing the turn-of-nut tightening method as described with reference to FIG. 7 and 8.

Figure 7:
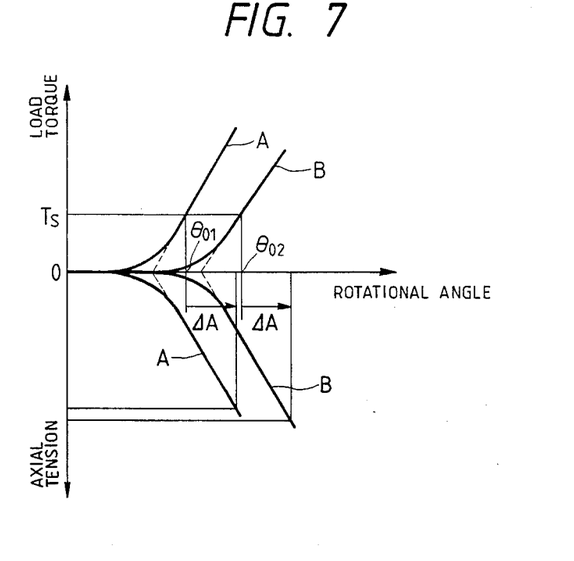
FIG. 7 is a combined illustration of load torque vs. rotational angle and axial tension vs. rotational angle characteristics useful in explaining the conceptional portion of the present invention.

According to the method illustrated in FIG. 7, (not the present invention) a point at which a fixed torque of a load Ts is generated is determined as a screwed tightening starting point $\phi o1$ or $\phi o2$ respectively for the two different screws A and B. Thereafter, the screws tighten further by a preset or fixed rotational angle $\Delta A$ in an attempt to obtain the desired axial tension. However, there is a drawback that where the coefficients of friction of the two screws A and B are different from each other, as illustrated, a dispersion or difference in the axial tension will appear as shown in FIG. 7. As seen in FIG. 7, the screw A will have less axial tension than the screw B, although both were rotated through the same $\Delta A$ from their starting point. Therefore, determining a starting point according to a fixed load does not produce accurate results and moreover requires the use of an expensive torque measuring device.

Figure 8:
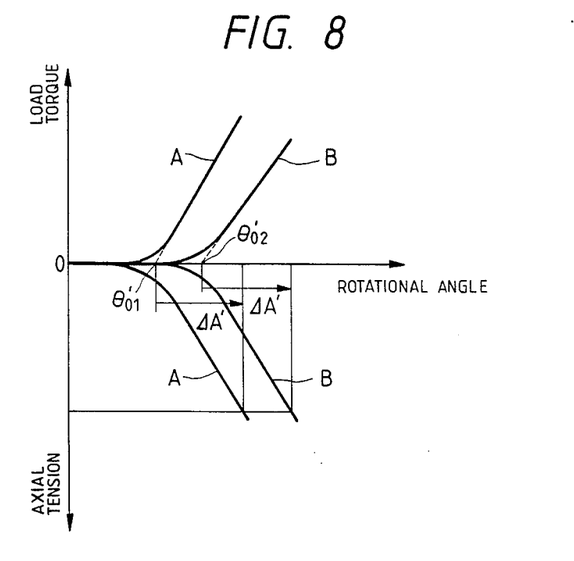
FIG. 8 is a combined illustration of load torque vs. rotational angle and axial tension vs. rotational angle characteristics useful in explaining the conceptional portion of the present invention.

According to the method illustrated in FIG. 8, (not the present invention) a linear expression of the linear portion of a rotary angle vs. load torque characteristic is determined from torque data and this linear portion is extended to the no-load torque for each of the screws A and B to determine the screw starting points $\phi_o1$ and $\phi_o2$, respectively. Thereafter, the screws are tightened further by the same rotational angle $\Delta A$, from this point. This method is more fully set forth in Japanese Laid-Open Patent No. 62-6246482, disclosure of which is incorporated herein in its entirety. According to this method of determination, even if the coefficient of friction of the screw A is quite different from the screw B, no dispersion in the axial tension results are encountered, at least to the high degree of accuracy desired. However, this method of determination has the drawback, as mentioned previously, that a torque measuring device and a torque converting device must be employed in addition to an angle measuring device, so that the expense and bulk of the apparatus is quite high. Additionally, the torque measuring device involves analog signals that are subject to noise distortion, which will affect the accuracy of the results. Shown in FIG. 3 of this reference, different coefficients of friction for different screws of the same type will result in different linear portions of the characteristic curves, which linear portions have different slopes, Which is one reason for the inaccuracy obtained with the method of FIG. 7. This document also discloses the type of controller that may be employed in the present invention, for example as shown in FIG. 1 of the present invention, to be described more fully.

According to the present invention, the rotational angle starting point is determined according to the linear portion of the curve determined by the expression (3) and illustrated in FIG. 3. Accordingly, the rotational starting angles $\phi'o1$ and $\phi'o2$ are calculated in accordance with this linear expression for the screws A and B respectively. The rotational angle starting point is a starting point where the linear extension of this linear portion intersects the free running speed line at a point, more specifically the straight line of rotational speed under no load, defined as the speed of the device when the tightening torque is zero. This free running speed is easily measured using only angle/time data from the encoder at the beginning of assembly for such screw. This intersection point is preferably determined as the tightening starting point for the present invention to obtain the most accurate results. However, it is further possible according to a broader aspect of the present invention to determine the starting point in a manner similar to FIG. 7 or further to the left from the starting points of FIG. 2 according to the snug method, if less accurate results can be tolerated while still getting the benefit of the present invention with respect to the employment of only a shaft angle measurement device.

However, the most preferred form of the present invention relates to the determination of the starting point as the intersection of the linear extension of the linear portion of the characteristic curve to its intersection with the free running, constant speed line.

As shown in FIG. 3 of Japanese Laid-Open Patent No. 62-246482, even though the linear lines for two different screws have two different slopes, for the torque vs. rotational angle curves (as mentioned above, the same curves would be obtained for speed vs. rotational angle), the axial tension vs. rotational angle characteristic is linear with only a common slope for the different screws, to obtain superior accurate results. The Japanese Patent relates only to the measurement of torque and the torque curves. The present invention relates to the angle relationship with respect to time, which determines speed, to obtain even more accurate results. Therefore, while it may seem recommendable to determine a rotational starting angle $\phi o1$ or $\phi o2$ when a fixed preset rotational speed ws is reached as a screw tightening starting point since the preset rotational speed s varies significantly in response to angle upon tightening of the screw, the dispersion in the axial tension is also great. Accordingly, it is not preferable to determine the rotational angle $\phi o1$ as a screw starting point.

The present invention employs a rotational angle of $\phi'o1$ as the starting point as determined according to the following.

The screw tightening device according to the present embodiment is enabled to receive rotational angle data for each predetermined very small sampling time $\Delta t$. Accordingly, the rotational speed w of the device can be calculated in accordance with the expression (2) above. The rotational speed wo before tightening of a screw is started is constant because there is no load application, and it is represented by an expression (4) below;

$$\omega o = \Delta \theta o / \Delta t \quad (4)$$

wherein $\Delta \phi o$ is a variation angle data taken for each sampling time $\Delta t$ during no-load running.

Figure 4:
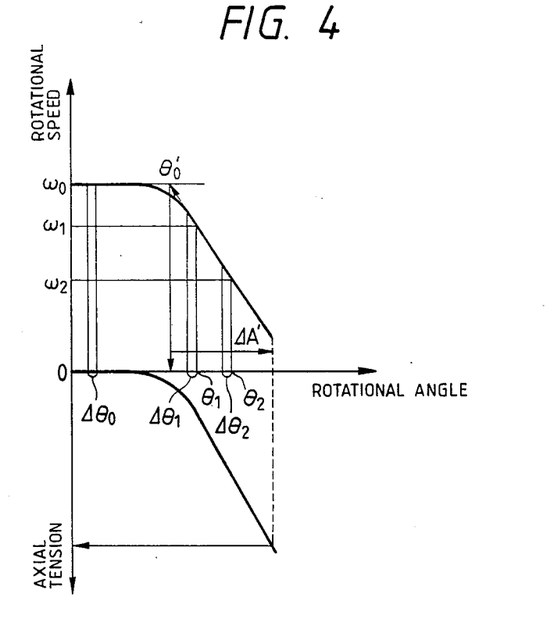
FIG. 4 is a rotational speed vs. rotational angle diagram illustrating the determination of the linear portion according to the present invention.

Referring to FIG. 4, where rotational angles, rotational speeds and variations of the rotational angles at two points in linear regions of the rotational angle—rotational speed characteristics are denoted by $\phi 1$, $\phi 2$, w1, w2 and $\Delta \phi 1$, $\Delta \phi 2$ respectively, then w1 and w2 are given in reference to the expression (4) above by:

$$\omega 1 = \Delta \theta 1 / \Delta t \quad (5)$$

$$\omega 2 = \Delta \theta 2 / \Delta t \quad (6)$$

Further, where $$\Delta \theta_1 = \theta_1 - \theta_1 \quad (7)$$

$$\Delta \theta_2 = \theta_2 - \theta_2 \quad (8)$$

the linear expression of the linear portion of the rotational angle—rotational speed characteristic is given by an expression (9) below:

$$\omega = \frac{\omega_2 - \omega_1}{\theta_2 - \theta_1} (\theta - \theta_1) + \omega_1 \quad (9)$$

Here, $\phi 1t$, $\phi 2t$ denote rotational angle data at points earlier by $\Delta t$ than $\phi 1$ and $\phi 2$, respectively.

Thus, if a point of intersection between the expression (9) above and $$w = wo \quad (10)$$

is calculated, then the point is a screw tightening starting point $\phi'o1$, that is $\phi o1'$.

Substituting the expressions (4), (5) and (6) into an expression (11) below, $$\theta_0' = \frac{\omega_2 - \omega_0}{\omega_2 - \omega_1} \theta_1 - \frac{\omega_1 - \omega_0}{\omega_2 - \omega_1} \theta_2 \quad (11)$$

we obtain $$\theta_0' = \frac{\Delta \theta_2 - \Delta \theta_0}{\Delta \theta_2 - \Delta \theta_1} \theta_1 - \frac{\Delta \theta_1 - \Delta \theta_0}{\Delta \theta_2 - \Delta \theta_1} \theta_2 \quad (12)$$

Further substituting the expressions (7) and (8) into the expression (12) above, we obtain $$\theta_0' = \frac{\theta_2 - \theta_{2a} - \Delta \theta_0}{(\theta_2 - \theta_{2a}) - (\theta_1 - \theta_{1a})} \theta_1 - \frac{\theta_1 - \theta_{1a} - \Delta \theta_0}{(\theta_2 - \theta_{2a}) - (\theta_1 - \theta_{1a})} \theta_2 \quad (13)$$

Thus, a screw tightening starting point can be calculated only from rotational angle data which are sampled for each predetermined very small sampling time $\Delta t$. With $\Delta t$ being fixed, although not necessary, time drops out of the equation. Similar equations may be developed for measurement of time as the variable between fixed $\Delta \phi$, that is fixed angle increments so that the angle increments Would drop out of the formula and time variables would be left.

While in the method described above a screw tightening starting point $\phi o'$ is determined based on data of the linear portion of the rotational angle—rotational speed characteristic, it is possible to approximate the linear portion to a linear line by the method of least squares based on a large number of data of the linear portion to find out a screw tightening starting point with a higher degree of accuracy, and this is adopted by the present embodiment.

Figure 5:
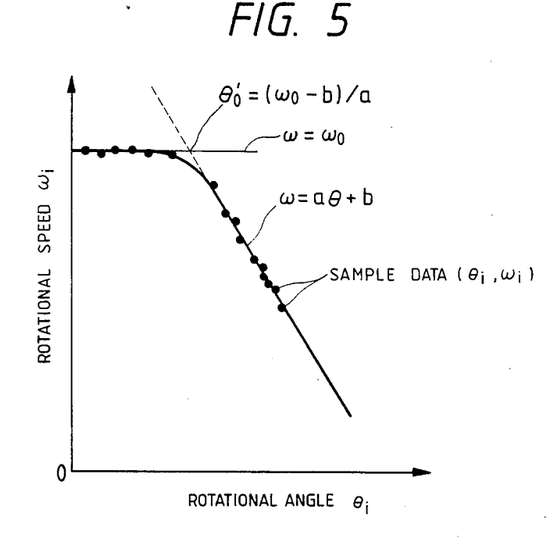
FIG. 5 is a rotational speed vs. rotational angle diagram illustrating the determination of the linear portion according to the present invention.

In particular, referring to FIG. 5, rotational speed data is represented by ($\phi1,w1$). In this instance, a screw tightening starting point $\phi o'$ is represented by an expression (14) below by the method of least squares:

$$\phi o' = (wo - b)/a \tag{14}$$

where $$a = \frac{N \sum_{i=1}^{N} \theta_1 \omega_1 - \sum_{i=1}^{N} \theta_1 \sum_{i=1}^{N} \omega_1}{N \sum_{i=1}^{N} \theta_1^2 - \left(\sum_{i=1}^{N} \theta_1\right)^2} \tag{15}$$

$$b = \frac{\sum_{i=1}^{N} \theta_1^2 \sum_{i=1}^{N} \omega_1 - \sum_{i=1}^{N} \theta_1 \sum_{i=1}^{N} \theta_1 \omega_1}{N \sum_{i=1}^{N} \theta_1^2 - \left(\sum_{i=1}^{N} \theta_1\right)^2} \tag{16}$$

and N is a number of sample data.

If a rotational speed is converted into a rotational angle, then $$\sum_{i=1}^{N} \omega_1 = (\theta_N - \theta_{1a})/\Delta t \tag{17}$$

$$\sum_{i=1}^{N} \theta_1 \omega_1 = \left(\sum_{i=1}^{N} \theta_1^2 - \sum_{i=1}^{N} \theta_1 \theta_{1-1}\right) \Delta t \tag{18}$$

$$\theta_{1a} = (\theta_1)_1 = 0 \tag{19}$$

Accordingly, substituting the expressions (17) and (18) into the expressions (15) and (16), we obtain expressions (20) and (21):

$$a = \frac{1}{\Delta t} \cdot \frac{N\left(\sum_{i=1}^{N} \theta_1^2 - \sum_{i=1}^{N} \theta_1 \theta_{1-1}\right) - (\theta_N - \theta_{1g})\Sigma\theta_1}{N \sum_{i=1}^{N} \theta_1^2 - \left(\sum_{i=1}^{N} \theta_1\right)^2} \tag{20}$$

$$b = \frac{1}{\Delta t} \cdot \frac{(\theta_N - \theta_{1a}) \sum_{i=1}^{N} \theta_1^2 - \sum_{i=1}^{N} \theta_1 \left(\sum_{i=1}^{N} \theta_1^2 - \sum_{i=1}^{N} \theta_1 \theta_{1-1}\right)}{N \sum_{i=1}^{N} \theta_1 - \left(\sum_{i=1}^{N} \theta_1\right)^2} \tag{21}$$

Further, substituting the expressions (4), (20) and (21) into the expression (14), we obtain a following expression (22):

$$\theta o' = (\Delta \theta o - b')/a' \tag{22}$$

where $$a' = \frac{N\left(\sum_{i=1}^{N} \theta_1^2 - \sum_{i=1}^{N} \theta_1 \theta_{1-1}\right) - (\theta_N - \theta_{1g})\Sigma\theta_1}{N \sum_{i=1}^{N} \theta_1^2 - \left(\sum_{i=1}^{N} \theta_1\right)^2} \tag{23}$$

$$b' = \frac{(\theta_N - \theta_{1g}) \sum_{i=1}^{N} \theta_1^2 - \sum_{i=1}^{N} \theta_1 \left(\sum_{i=1}^{N} \theta_1^2 - \sum_{i=1}^{N} \theta_1 \theta_{1-1}\right)}{N \sum_{i=1}^{N} \theta_1 - \left(\sum_{i=1}^{N} \theta_1\right)^2} \tag{24}$$

In this manner, a screw tightening starting point $\phi o'$ can be found out stably with a high degree of accuracy from rotational angle data without being influenced by the sampling time $\Delta t$. Similarly, it ma be determined from time data without being influenced by $\Delta\phi$; in either case only one measuring instrument, i.e. detector, measuring the angle/time relationship is employed.

Data of a linear region of the rotational angle—rotational speed characteristic may be determined by various methods. For example, data smaller than a rotational speed after a screw has been tightened sufficiently may be determined as such data, or a gradient of the rotational angle—rotational speed characteristic is repetitively calculated and after the gradient has been fixed, data are collected. However, any method may be adopted.

Operation of the screw tightening device depending upon rotational angle control having such a construction as described above will be described with reference to FIG. 1 and 6.

Figure 6:
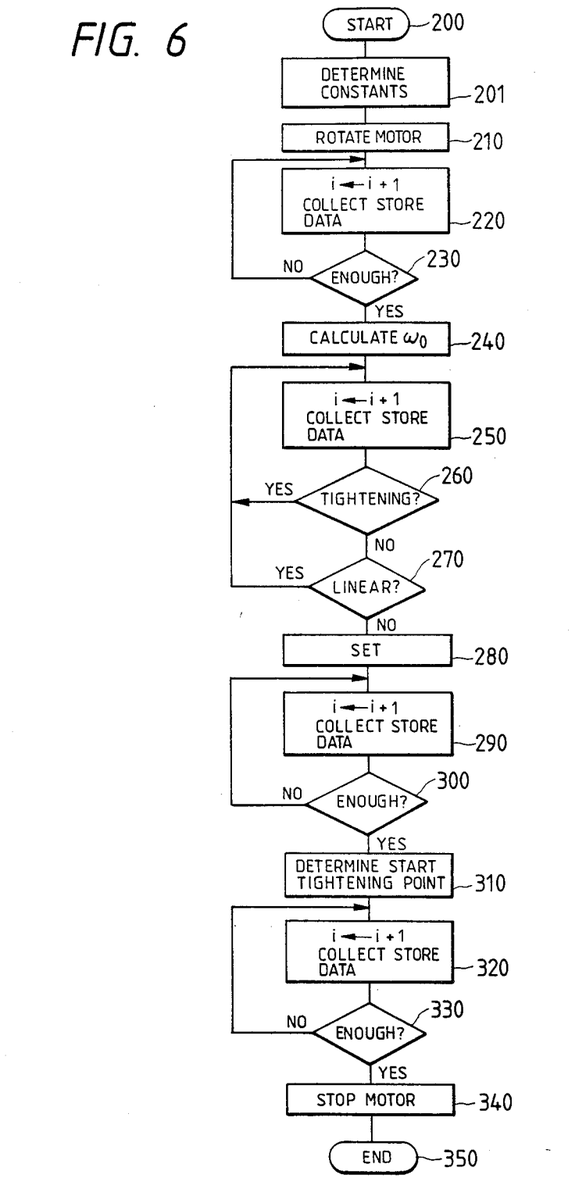
FIG. 6 is a flow chart illustrating the method and the function of the controller according to the present invention.

If the screw tightening device is rendered operative and operation starts at step 200, with reference to FIG. 1 and FIG. 6 then, predetermined constants and variables are determined at step 201. Such constants include an aimed tightening angle $\phi t$, a number n of samples of rotational angle data $\phi i$ to be collected in order to determine a rotational speed wo upon no load operation, a number N of samples of rotational angle data Oi of a linear portion of a rotational angle—rotational speed characteristic during tightening of a screw, and small values E1 and E2 (or E2') which will be hereinafter described. Further, an internal variable no is set to "1" and i to "0". Then, at step 210, the controller 9 delivers a signal to the servo amplifier 8 to rotate the servomotor 1. Consequently, a screw 5 is turned at a fixed turning speed wo in a no-load condition before tightening. Then at step 220, for each $\Delta t$, the variable i is incremented by one and a rotational angle date $\phi i$ is received from the rotary encoder and stored into the controller 9. At step 230, it is judged if the number of the sample data thus collected reaches n. The rotational speed wo is calculated in step 240 from the rotational angle data $\phi i$ collected so far in accordance with the following equation (25):

$$\omega_0 = \frac{\theta i - \theta^n 0}{n \Delta t} \tag{25}$$

Then at step 250, for each $\Delta t$, the variable i is incremented by one and the rotational angle data $\phi i$ is received from the rotary encoder and stored into the controller 9 similarly as at step 220. Subsequently at step 260, it is judged in accordance with the following equation (26) whether the screw has been started to be tightened.

$$\frac{\theta_i - \theta^n_i - 1}{\Delta t} - \omega_0 < \epsilon_1 \qquad (26)$$

In particular, in case, it is determined that the screw has been started to be tightened. Here, the reason why the expression (26) above is not made an equation (=0), the expression $(\phi i - \phi i - 1)\Delta t - wo$ is not stabilized at a value "0" due to uneven rotation or the like. The variable is set to an optimum value determined depending upon data when a screw is actually tightened. For example, a maximum one of values of $(\phi i - \phi i - 1)/\Delta t - wo$ when several screws are tightened is selected as El (refer to an expression (27) below).

$$\epsilon_1 = \max\{(\theta_i - \theta_{i-1})/\Delta t - \omega_0\} \qquad (27)$$

Then at step 270, a linear portion of the rotational angle—rotational speed characteristic during tightening of the screw is determined. In particular, when a change in rotational speed with respect to a change in rotational angle is constant (i.e., when the angular acceleration is zero), the rotational angle—rotational speed characteristic is determined to be linear, and actually the rotational angle—rotational speed characteristic is determined to be linear when the following discriminant (28) is met;

$$\frac{\omega_i - \omega_{i-1}}{\theta_i - \theta_{i-1}} - \frac{\omega_{i-1} - \omega_{i-2}}{\theta_{i-1} - \theta_{i-2}} < \epsilon_2 \qquad (28)$$

Where the rotational speed wi is a change in rotational angle for t. In particular, $$\omega_i = \frac{\theta_i - \theta_{i-1}}{\Delta t} \qquad (29)$$

Substituting the expression (29) into the equation (28), we obtain the following processed discriminant (30):

$$\frac{\theta_{i-3} - \theta_{i-2}}{\theta_{i-1} - \theta_{i-3}} - \frac{\theta_{i-1} - \theta_{i-2}}{\theta_i - \theta_{i-1}} < \epsilon_2' \qquad (30)$$

The reason left side of the expression (28) above is not stabilized at a value "0" is due to uneven rotation or an error in measurement or else a linearity of a linear portion of the rotational angle—rotational speed characteristic that is set to an optimum value which is determined depending upon data when a screw is actually tightened, similar to the determining method of El. After the equation (28) or (30) above had been met, the rotational angle—rotational speed characteristic can be considered to be linear. Thus, at step 280, n is set to i, and then at step 290, i is incremented one by one similarly as at steps 220 and 250, and each time i is incremented, the rotational angle data $\phi i$ is fetched from the rotary encoder and stored into the controller 9. At step 300, it is judged whether the number N of samples for a linear region which was determined at step 210 is reached, and in case the number N of samples is reached, process of the controller 9 advances to step 310 at which a tightening starting point $\phi o'$ is calculated using the expressions (22), (23) and (24) given hereinabove. Then at step 320, the variable i is incremented one by one similarly as at steps 220, 250 and 290, and each time the variable i is incremented, the rotational angle data $\phi i$ then is fetched from the rotary encoder and stored into the controller 9. After then, at step 330, it is determined from the following equation (31) whether the aimed tightening angle $\phi t$ is reached:

$$\theta t - \theta_i \leqq \theta_0' \qquad (31)$$

If the expression (31) is met, the controller 9 delivers, at step 340, a signal to the servo amplifier 8 to stop the servomotor 1, and then at step 350, the tightening operation is completed. In case stopping of the motor at step 340 is so short that there may appear an angular error when the tightening is stopped, a deceleration routine for the motor may be put between the steps 320 and 330 so that the motor may be stopped just when $\phi t$ is met.

In this manner, tightening of screws wherein the dispersion in axial tension is very small is enabled using only rotational angle/time data.

With the embodiment described so far, since tightening depending upon rotational angle control is enabled only by a rotational angle/time measuring instrument without the necessity of a torque measuring instrument or a converting device which converts detected values of a motor current and a motor voltage into a torque, there is an effect that construction of the screw tightening device can be simplified and reduced in cost. Further, where a rotary encoder is employed as the rotational angle/time measuring instrument, data to be received are digital values and are not influenced by noise involved in analog data peculiar to a torque measuring instrument or a converting device, and accordingly, tightening depending upon rotational angle/time control with a high degree of accuracy is enabled. Since a screw tightening starting point (the mos important point in tightening of a screw) depending upon rotational angle control can be found stably with a high degree of accuracy, there is an effect that, comparing with the calibrated wrench tightening method, tightening of screws with a high degree of accuracy wherein the dispersion in axial tension of the screws 5 is very small can be attained.

As described in detail according to the present invention, an inexpensive screw tightening device depending upon rotational angle/time control can be provided wherein management of tightening force with a high degree of accuracy is possible.

While preferred embodiments along with variations and modifications have been set forth for disclosing the best mode and important details, further embodiments, variations and modifications are contemplated according to the broader aspects of the present invention, all as set forth in the spirit and scope of the following claims.

We claim:

1. A threaded coupling tightening device, comprising:
    motor means having a shaft for operatively connecting to the coupling and for rotating said shaft with a velocity that decreases as shaft angular rotation increases during tightening of the threaded coupling;
    measuring means responsive to the rotation of said shaft for providing plural shaft angle/time data with respect to a plurality of shaft angular positions; and
    means for controlling said motor means to rotate said shaft from a starting point of tightening based solely on said angle/time data inputted from said measuring means, through a fixed rotation angle.

2. The device of claim 1, further comprising means for storing the fixed rotational angle corresponding to the desired angle tightening of the coupling.

3. A threaded coupling tightening device, comprising:
motor means having a shaft for operatively connecting to the coupling and for rotating said shaft with a velocity that decreases as shaft angular rotation increases during tightening of the threaded coupling;
measuring means responsive to the rotation of said shaft for providing plural shaft angle/time data with respect to a plurality of shaft positions; and
means for controlling said motor to rotate said motor shaft for a fixed rotational angle based only upon said angle/time data from said means for measuring.

4. A device according to claim 1, wherein said controlling determining a linear portion of the angle/time data vs. shaft angular position of said motor base solely upon said angle/time data of said measuring means and for means includes means for calculating the starting point of the tightening from the determination of the linear portion.

5. A method of tightening a threaded coupling member, comprising the steps of:
rotating a threaded coupling member by a motor and simultaneously measuring plural motor shaft rotation angle/time data,
determining a linear portion of said data only from said angle/time data and decreasing motor speed in response to said determining;
extending said linear portion of said data backward in time to estimate starting angle of shaft rotation wherein the threaded coupling member first started to tighten; and thereafter tightening the threshold coupling only for a fixed angular relationship from said starting angle.

6. The method of claim 5, wherein said step of determining includes applying the method of least squares based upon said angle/time data, and based upon said linear portion calculating a prior angle of shaft rotation at which the linear portion extension backward in time has a fixed angle of shaft rotation for all like coupling members having different coefficients of friction and corresponding different slopes for their respective linear portions.

7. A threaded rotary coupling tightening device, comprising:
shaft means for engaging said coupling;
motor means for rotating said shaft means with a speed characteristic that decreases linearly with tightening at least during a linear portion of said tightening;
measuring means for providing a plurality of shaft angle/time data;
controlling means for determining the linear portion of said shaft angle/time data;
said controlling means stopping said motor and correspondingly stopping the tightening of said coupling based solely on said angle/time data.

8. The device of claim 7, wherein said controlling means determines the extension of said linear portion backward in time to a shaft starting angle corresponding approximately to a point wherein the extensions of linear portions for like couplings with different coefficients of friction and accordingly different slopes of their linear portions meet at a common point, and rotating said motor for only a fixed angle from said shaft starting angle.

9. The device of claim 8, wherein said measuring means provides said angle/time data only as digital data and said controlling means processes said data only as digital data, so that the accuracy of said data is not deteriorated by noise, as would be with an analog signal.

10. The device of claim 9, wherein said controlling means, for each coupling, determines a constant motor speed occurring before tightening from only said angle/time data; and
said starting angle corresponds to a point on the extension of said linear portion corresponding to an extension of the constant motor speed before starting of tightening.

11. The device of claim 10, wherein said controlling means determines said linear portion according to the method of least squares based upon only said angle/time data.

12. The device of claim 11, wherein said measuring means measures only shaft angles at fixed repeating timed intervals, so that time is not a variable.

13. The device of claim 8, wherein said motor means has a no-load constant motor speed, and said controlling means further determines the no-load constant motor speed for each coupling only according to said angle/time data from said measuring means, and said controlling means determines said starting point as the intersection of the extension of said linear portion with the no-load constant speed with respect to a speed vs. shaft rotational angle relationship separately for each different coupling.

14. The device of claim 8, wherein said controlling means further determines the no-load constant motor speed for each coupling only according to said angle/time data from said measuring means, and said controlling means determines said starting point as the intersection of the extension of said linear portion with the no-load constant speed with respect to a speed vs. shaft rotational angle relationship separately for each different coupling.

15. The device of claim 14, wherein said measuring means measures only shaft angles at fixed repeating timed intervals, so that time is not a variable.

16. The device of claim 14, wherein said measuring means provides said angle/time data only as digital data and said controlling means processes said data only as digital data, so that the accuracy of said data is not deteriorated by noise, as would be with an analog signal.

17. The device of claim 16, wherein said controlling means determines said linear portion according to the method of least squares based upon only said angle/time data.

18. The device of claim 16, wherein said measuring means measures only shaft angles at fixed repeating timed intervals, so that time is not a variable.

19. The device of claim 18, wherein said controlling means determines said linear portion according to the method of least squares based upon only said angle/time data.

20. The device of claim 7, wherein said measuring means provides said angle/time data only as digital data and said controlling means processes said data only as digital data, so that the accuracy of said data is not deteriorated by noise, as would be with an analog signal.

21. The device of claim 7, wherein said controlling means determines said linear portion according to the method of least squares based upon only said angle/time data.

22. The device of claim 7, wherein said measuring means measures only shaft angles at fixed repeating timed intervals, so that time is not a variable.

23. A threaded coupling tightening device, the tightening of which is controlled through a rotational angle, comprising:
means for discriminating roughly whether a tightening is started or not, including means for collecting data of a tightening angle and a tightening rotational speed;
means for discriminating whether a relation between the tightening angle and the tightening rotational speed is linear;
means for calculating a linear relationship between the tightening angle and the tightening rotational speed through a method of least squares; and
means for calculating a tightening start point in view of said linear relation, including means for discriminating whether the tightening start point has reached a predetermined tightening angle; and means for stopping the tightening of the threaded coupling tightening device when the predetermined tightening angle is reached.

* * * * *